Nov. 18, 1947.   P. N. CURRY   2,430,918
HYDRAULICALLY BALANCED SEAL
Filed Feb. 23, 1946
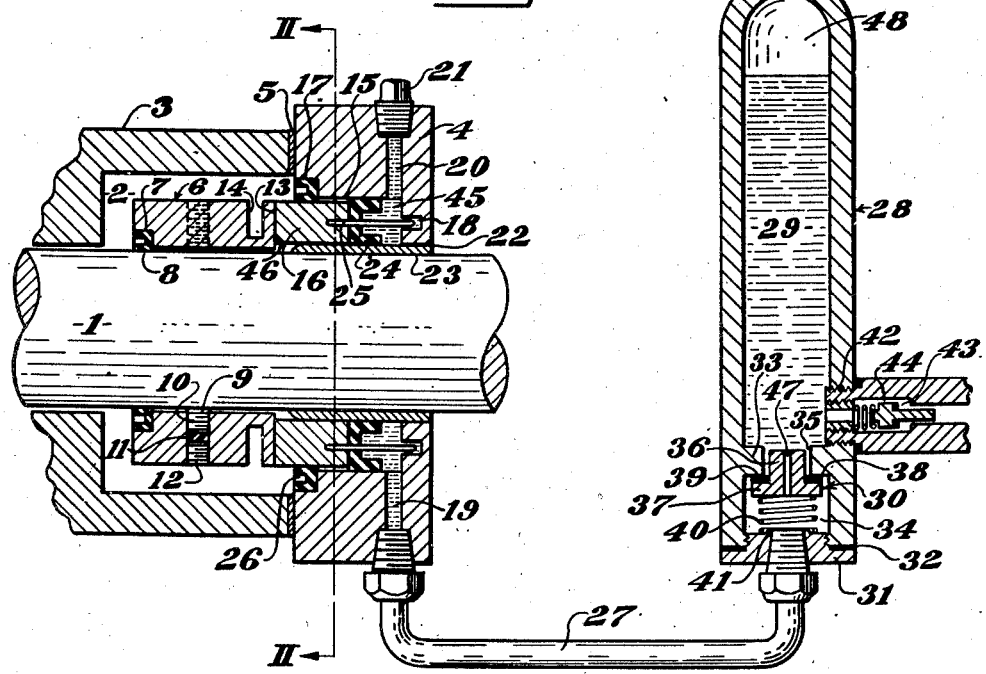
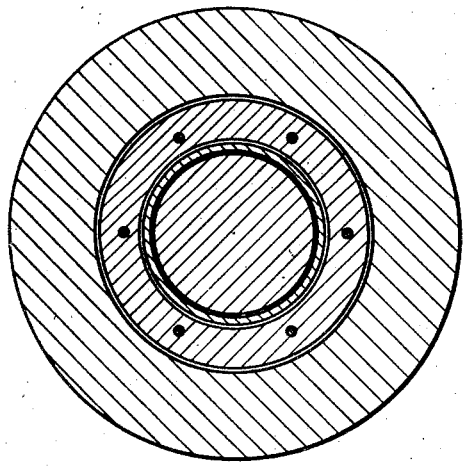
INVENTOR
*Paul N. Curry*
BY
ATTORNEY Patented Nov. 18, 1947

2,430,918

UNITED STATES PATENT OFFICE 2,430,918

HYDRAULICALLY BALANCED SEAL

Paul N. Curry, Kalamazoo, Mich.

Application February 23, 1946, Serial No. 649,545

1 Claim. (Cl. 286—7)

This invention relates to a mechanical seal for a rotating shaft, and particularly to a type thereof wherein the pressure holding the rotating and the non-rotating sealing faces together is independent of the pressure against which the seal is being maintained, whereby without disturbing the effectiveness of the seal, said first named pressure may be adjusted to a magnitude substantially less than said second named pressure and wear on said sealing faces accordingly minimized and other advantages obtained.

Although prior to this time there has been introduced to the industry a large number of different types of rotary mechanical seals, there has remained unsolved a number of problems connected therewith. Among the more important of these has been the problem of reducing the wear between the rotating and the non-rotating sealing faces in order to impart longer life to the mechanism. Certain attempts have been made to solve this problem by designing the seal parts to effect a balancing of pressures, but so far as I am aware the mechanisms so proposed are all somewhat complicated and hence are both expensive to construct and expensive to maintain.

There is a further problem which has arisen in the handling of hydrocarbons of low molecular weight, such as propane, at high pressures, such as over 200 pounds per square inch. Taking propane as an example it has been found that when it is being handled at a relatively high pressure by a centrifugal pump which is sealed by a seal of the type disclosed, for example, in U. S. Patent No. 2,247,505 to Kohler, a popping noise and eventual opening of the seal almost always occurs. This is believed to occur in the following manner. The propane from time to time in the operation of sealed equipment such as a pump will enter in minute quantities between the sealing faces. When this happens the great amount of friction existing between said faces generates sufficient heat to raise the temperature of the liquid propane to a point well beyond its critical temperature, whereby the propane vaporizes and exerts a pressure in the neighborhood of from 600 to 680 pounds per square inch. So long as this happens only with minute quantities of propane at any given instant the total force applied to the one, usually the rotating, sealing member is not enough to push it back from the other sealing member sufficiently thereby to open the seal, but it may, and often does, permit small quantities of gaseous propane to escape from the pump. Thus the seal may operate under these conditions for an indefinite period of time in a partially satisfactory manner, and only a popping noise will be heard as gaseous propane escapes in small puffs. However at some point during the operation of such a seal, a sufficient quantity of propane will work itself between the sealing faces of the seal and be vaporized at the same instant to supply sufficient force to push back the rotating sealing member and thereby open the seal. When this happens the seal will stay open inasmuch as the force supplied by the springs normally backing said rotating sealing member is not sufficient to close the seal against the friction of the packing material sealing the rotating sealing member to the shaft. Thus the seal remains open and the pump must be shut down and disassembled in order again to close the seal. This obviously is a great inconvenience and in a large refinery where the shutting down of one pump may, and often does, shut down a large unit in its entirety the condition described is likewise a great expense. Further, the intermittent escape of propane to the atmosphere is a great fire hazard which cannot be permitted to exist in establishments such as refineries where large quantities of flammable materials are being handled.

Accordingly, it has for a long time been imperative to develop a seal which would have a relatively small amount of friction existing between the rotating and non-rotating sealing faces in order to hold both the development of frictional heat and wear to a minimum and, further, to provide a seal which would effectively resist the sudden application of an opening pressure, and yet which would be sufficiently yieldable to follow irregularities normally existing in conventional pump construction.

Accordingly, a major object of my invention has been to provide a seal of the type mentioned having a relatively small amount of friction existing between the rotating and non-rotating sealing faces.

A further object of my invention has been to develop a seal of the type mentioned which will effectively resist a suddenly applied opening pressure of high magnitude, but which will yield as needed to follow normal constructional irregularities existing in the seal itself and/or in the pump to which it is applied.

A further object of my invention is to provide a seal of the type aforesaid which will be composed of relatively few parts and in which such parts will be relatively easy to fabricate and assemble.

A further object of my invention is to provide a seal as aforesaid which will be easy to install in operating position and which will be easy to remove and re-install.

A further object of my invention is to provide a seal as aforesaid which will operate without requiring supplemental or auxiliary moving apparatus operating therewith.

Other objects and purposes of my invention will be apparent to persons acquainted with equipment of this type upon examination of the accompanying drawings and reading of the following specification.

In the drawings:

Figure 1 shows a central longitudinal section of my improved seal installed in place on a rotary shaft within a stuffing box and also shows in central longitudinal section the pressure tank used therewith.

Figure 2 represents a transverse section taken on the line II—II of Figure 1.

My improved mechanism comprises in general a rotary seal having its rotating member fastened by suitable means fixedly to the shaft and having its non-rotating sealing member held within the stuffing box gland and backed by an incompressible liquid under pressure. This liquid communicates with a reservoir through a small orifice which will in a short period of time pass a small quantity of liquid flowing from said gland to said orifice but which in such a short period of time will not pass a large quantity. This is utilized to permit the non-rotating sealing member to move backwardly against the said liquid the small amount which is necessary to follow irregularities in the seal and/or pump construction, and to relieve pressure due to expansion on heating which may involve a greater movement but will do so only in a greater amount of time, but it prevents the non-rotating sealing member from moving backwardly against the said liquid the large amount in a short time necessary to enable said seal to open.

In the drawings there is shown a rotating shaft 1 extending through a stuffing box chamber 2 of the stuffing box 3 associated with any appropriate piece of equipment, such as any kind of rotary pump. Hereinafter, a pump will be assumed as the equipment concerned although it is to be clearly understood that this is illustrative only and not limiting. A gland 4 closes the end of the stuffing box chamber. A gasket 5 will normally be interposed between said gland and the outer face of said stuffing box, and any conventional means (not shown) may be utilized for holding tightly together the assembly of gland, gasket and stuffing box. It should be understood that to the extent these parts are shown they are represented schematically, and should be taken to indicate any form of stuffing box or other housing, having therein a rotating shaft and closed by a gland held in place by any form of holding means whatever.

Surrounding the shaft within the stuffing box is the rotating sealing member 6 comprising a ring of any material usual for this purpose, as steel, surrounding the shaft with sufficient clearance therefrom to be easily moved into position. At the inward end of said ring is an annular undercut 7 into which is inserted a packing 8. This packing is shown as a cupring, but it may be any form of conventional packing which will provide a secure seal against the passage of liquid between the inner surface of the ring 6 and the outer surface of the shaft 1. This cupring, or other packing, may be made of any material convenient for that purpose but it will normally be the packing material which is best resistant to corrosion from the particular liquid being handled within the pump. As specific examples I have in various applications advantageously used such rings made from rubber, from a product known as "Saran" made by the Dow Chemical Company, and a product known as "Teflon" manufactured by E. I. du Pont de Nemours and Company.

This rotating sealing member is fixedly secured to the shaft by a set screw 9 threadedly held within a radial opening 10. A further packing 11 is placed into said opening 10 and held in place by a second set screw 12.

The sealing face 13 of the rotating sealing member 6 is advantageously cooled by cutting into said ring a relatively deep channel 14, a short distance behind said sealing face. The exact depth of said channel and the distance it is to be spaced from the sealing face 13 will depend upon the material from which the rotating sealing member 6 is made and the amount of pressure which is to be imposed on the sealing faces. Since, as hereinafter pointed out in more detail, the design of this seal is such that such pressure will be relatively light, this channel may be much deeper than would be possible for a corresponding channel in presently known seals so that an adequate degree of cooling is secured. The channel should be made as deep as possible without unduly weakening the sealing member for the sealing face 13 should not be distorted back away from the opposed non-rotating sealing face.

In the gland 4 there is provided a central opening 15 for receiving the non-rotating sealing member 16 and the parts associated therewith. Said opening 15 is of sufficient size to provide an annular chamber of substantial width surrounding the shaft 1. An annular recess 17 is provided in the wall of said opening 15 at the end thereof adjacent the stuffing box chamber 2. A plurality, here six, pin receiving openings 18 are provided in the gland 4 at the bottom of said annular opening 15. Passageways 19 and 20 are provided from the exterior of said gland 4 to opposite sides of the opening 15. Through these passageways a cooling liquid may circulate under pressure if desired, but normally a static pressure without cooling circulation will be sufficient so that in the drawing the outer end of the passageway 20 is shown as closed by a plug 21.

Within the gland as above described there is also provided a further central opening 22 extending from the bottom of the central opening 15 through the rest of the gland and being of smaller diameter than said central opening 15. Into this opening is placed in any convenient manner, such as by pressing, a shell 23 tightly engaging the walls of said opening 22 but clearing the surface of shaft 1 by an easy running clearance. Within the annular chamber thus defined between the walls of the opening 15 and the radially outward wall of the shell 23 there is inserted a suitable packing 24, which is here shown as a cupring, having its open side facing the bottom of said annular chamber and spaced therefrom a distance sufficient to provide the backing pressure chamber 45. This cupring may, like the cupring 8, be made of any convenient material providing only it will afford a tight sealing against passage of liquid between its inward and outward surfaces and the respectively contiguous surfaces of the gland 4 and the shell 23.

Likewise within said annular chamber is snugly positioned the non-rotating sealing ring 16. This ring may be of any material usual for such purpose, such as a carbon or bronze material having a minimum of inter-particle openings. A plurality, here six, holding pins 25 are inserted, preferably by pressing, into suitable receiving openings in said non-rotating sealing ring 16, pass through appropriate openings in the cupring 24 and are received slidably into the respective pin receiving openings 18 of the gland. In this way said ring is positively held against rotation with respect to the gland 4. A further cupring 26, or other suitable packing, is placed in the recess 17 and is fitted thereinto sufficiently tightly to prevent liquid being handled by the pump and withing the stuffing box from passing between the non-rotating sealing member 16 and the wall of the opening 15 in the gland 4. This cupring or other packing will usually be made of the same material as the cupring, or other packing, 8, inasmuch as the same service will be required in each case. The non-rotating sealing member is thus held floatingly with respect to the gland 4 and, since it can slide with respect to the packing 26 and the cupring 24 can slide with respect to the walls of the annular opening 15, said non-rotating sealing member and the associated cupring 24 can have limited axial movement.

Connected to the passageway 19 through a suitable conduit 27 is the pressure tank 28. This tank is constructed in sufficient strength to withstand whatever internal pressure is required to impose the hereinafter described backing pressure onto the seal. The conduit 27 communicates with the pressure chamber 29 within said tank through and past the check valve 30. For this purpose the conduit 27 is suitably fitted into a cap 31 which is threadedly engaged with one end of the pressure tank 28. A suitable gasket 32 is provided to insure against leakage of pressure fluid from the pressure tank at this point. The partition 33 is spaced a short distance from the inward surface of the cap 31 and defines therewith an intermediate chamber 34 communicating with the pressure chamber 29 through a valve opening 35 in said partition. The valve 30 has a body part 36 extending through said opening 35 and a stop part 37 backing a relatively soft seat engaging member 38. A narrow passageway 47 extends longitudinally through said valve body, of such size as to constitute a substantial restriction in the passageway from the conduit 27 to the pressure chamber 29. When the valve is closed this seat engaging member 38 engages the lower surface 39 of the partition 33 as a valve seat to close said valve and prevent passage of fluid from the intermediate chamber 34 to the pressure chamber 29 excepting through said passageway. The spring 40 held in place by a suitable boss 41 provides resilient urging of said valve toward the valve seat.

An opening 42 is provided through a side of the pressure tank 28 and therein is affixed in a liquid tight manner any convenient means for injecting pressure fluid into the pressure chamber 29 under a selected pressure. This may be by a separate pump, a connection to the discharge line of the pump being sealed, a grease gun, static line or other convenient means. A check valve 43 backed by a suitable spring 44 may be supplied if said pressure source is not continuous. In the construction here shown it is not necessary that such pressure source be continuous and hence it will be normally applied only with sufficient frequency to keep the mechanism in satisfactory operating condition. If desired, a pressure indicator (not shown) may be applied at some convenient point on the pressure tank 28 communicating with the interior thereof, or it may be applied at the end of the passageway 20 by being inserted into the place shown in the drawing as occupied by the plug 21.

The parts are assembled in the following manner: The rotating sealing ring 6 with the packing 8 in position is placed over the end of the shaft 1 and pushed into the desired position on the shaft. The set screw 9 is then tightened down against the shaft, the packing 11 placed in the opening 10 above the set screw 9 and the second set screw 12 inserted and tightened against the said packing. The manner of reaching the set screws will depend upon the construction of the pump and may require the lifting of one-half of the pump casing in a horizontally split pump, the lateral pulling of the shaft in the case of a vertically split pump, or in some cases it will be possible to tighten the set screws by inserting into the stuffing box from the open end thereof an L-shaped tool capable of suitable engagement with said set screws for tightening of same.

The gland is assembled by pressing the shell 23 into the opening 22. If a tight press-fit is provided no further engaging means will be necessary. The holding pins 25 are similarly pressed into suitable openings within the non-rotating sealing member 16, the cupring 24 placed onto said pins in position against said non-rotating sealing member and the whole inserted into the annular chamber formed between the shell 23 and the wall of the opening 15, with the holding pins 25 received in the pin openings 18. The said pins are of such length and the positioning of the non-rotating sealing member 16 is such that the pins reach well into the pin receiving openings 18 but not entirely to the bottom thereof and the cupring 24 is sufficiently spaced from the bottom of the opening 15 to assure the maintenance of the chamber 45 therein. The cupring 26 may then be put in place around the non-rotating sealing member 16 and within the opening 17.

With the gland and parts associated therewith thus assembled (these parts will normally be preassembled at the factory) the assembly is led over the end of the shaft suitably preceded by the gland gasket 5 and the whole clamped together by whatever means are provided (not here shown). Care must be taken that all adjustments are such that when the gland is tightened into place the sealing face 13 of the rotating sealing member 6 and the sealing face 46 of the non-rotating sealing member 16 contact each other firmly but that no undue pressure is placed thereon. This, if reasonable care is taken, is easy to accomplish. The non-rotating sealing assembly is as above indicated placed so that the pins do not contact the bottoms of their respective receiving openings 18. Thus as the gland is tightened into place and the non-rotating sealing member 16 is urged against the rotating sealing member 6 it will within its constructional limits be moved backwardly (rightwardly as appearing in the drawing) as the gland is tightened.

With the plug 21 removed to vent air, a non-compressible liquid, such as water or oil, is inserted past the check valve 43. As soon as the chamber 45 is filled, the plug 21 will be replaced and the introduction of said hydraulic fluid continued under pressure until the desired pressure within the system is reached. The source of hydraulic fluid may then be disconnected and remain disconnected except for occasional servicing to maintain the selected pressure. Air trapped in the pressure dome 48 will serve to hold the liquid under a steady, resilient pressure.

In operation it will be observed that there are no areas upon which the pressure maintained within the pump can be imposed to transfer such pressure onto the contacting sealing faces 13 and 46. The pressure acting against the inward end of the rotating sealing member 6 is held firmly by the set screw 9. Pressure acting within the channel 14 acts equally in both directions. Hence, the pressure needed within the hydraulic chamber 45 is only that necessary to hold the sealing faces 13 and 46 together with sufficient tightness to prevent the penetration between the said faces of the fluid within the stuffing box. While this pressure may in some cases be substantial, it will normally be much less than where it is necessary also to resist the operating pressure of the pump.

As a specific example, illustrative but not limiting, approximately 100 pounds per square inch pressure within the backing chamber 45 will be sufficient to hold a successful seal against propane at a stuffing box pressure of 250 pounds per square inch. Where the material being pumped is of higher molecular weight, as in the case of lubricating oil or even gasoline, the backing pressure may be still less.

As the shaft 1 rotates and the rotating sealing member 6 rotates with it the non-rotating sealing member 16 will experience slight intermittent movements in a direction axial of said shaft 1 following irregularities in the balancing of said shaft and variations from exact perpendicularity of the sealing faces 13 and 46 with respect to the axis of the shaft. This movement will be slight, but is inevitable, and the displacement of hydraulic fluid from the chamber 45 caused thereby will readily pass through the small opening 47 provided through the body part 36 of the valve 30. As the seal parts heat and expand and the non-rotating member 16, together with the cup-ring 24, accordingly moves backwardly against the backing fluid, said fluid will similarly move back through the small passageway 47 into the pressure chamber 29 and thus prevent the creation of excess pressure within the chamber 45 or on the seal faces.

However, when a quantity of pump liquid such as propane penetrates between the sealing faces, is heated to its critical temperature and vaporizes, so that there is suddenly imposed a pressure of approximately 650 pounds per square inch against the sealing face 46 tending to push the non-rotating sealing member 16 in a direction appearing as rightward in the drawing, which pressure in ordinary installation may often provide a total force of several hundred pounds, the non-rotating sealing member 16 will tend to move backwardly against the hydraulic liquid within the chamber 45 so rapidly that the liquid cannot pass through the small passageway 47 at a sufficient rate to relieve the pressure. Thus the non-rotating sealing member is firmly held against backward movement and the seal is held against opening until the gas escapes and the pressure is dissipated. In this way there is obtained sufficient flexibility and resilience to meet ordinary working conditions but firm holding is provided against the opening of the seal from the vaporizing of hydrocarbon materials of low molecular weight, such as propane, between the faces of the seals.

The pressure of the fluid in the chamber 45 will, of course, be sufficient to push the non-rotating sealing member 16 forward to compensate for wear through the normal life of the sealing parts. The elastic gas under pressure in the pressure dome 48 will hold a resilient pressure on the pressure liquid and hold it substantially steady throughout the normal operation of the seal. Only occasional injections of additional pressure liquid will ordinarily be needed to maintain proper pressure.

Accordingly, I have disclosed a seal construction meeting the objects and purposes above outlined. This seal is believed to employ substantially different principles from seals known prior hereto, so that, although numerous variations from the specific design herein shown for illustrative purposes may be made, such variations will all fall within the scope of my hereinafter appended claim excepting as said claim expressly provide otherwise.

I claim:

A mechanical seal for sealing an opening in a housing through which passes a rotatable shaft, comprising: a rotating sealing member held fixedly with respect to said shaft and having a sealing face at one end thereof; means preventing the passage of liquid between said rotating sealing member and said shaft; a gland closing said opening and having a central opening therein through which said shaft extends, a part of said central opening in said gland being of substantially greater diameter than another part; a cylindrical shell within the smaller of said two portions of said central opening, surrounding said shaft and providing in cooperation with the walls of the larger portion of said central opening an annular chamber; an annular non-rotating sealing member within said annular chamber; an annular packing member within said annular chamber abutting the end of said non-rotating sealing member inwardly of said annular chamber; a plurality of pins associated with said non-rotating sealing member and said gland holding the non-rotating sealing member against rotation with respect to said gland but permitting movement in a direction substantially axial of said shaft; said annular packing member being spaced from the bottom of said annular chamber whereby to define a backing chamber at the bottom of said annular chamber adapted for receiving a pressure fluid; means preventing the passage of fluid from within said housing between said non-rotating sealing member and said gland; a pressure fluid within said backing chamber and elastic means imposing a resilient pressure upon said fluid.

PAUL N. CURRY.

REFERENCES CITED

The following references are of record in the file of this patent:

UNITED STATES PATENTS

| Number | Name | Date |
|---|---|---|
| 1,097,074 | Bennett | May 19, 1915 |
| 2,023,206 | Olson | Dec. 3, 1935 |
| 2,128,744 | Hornschuch | Aug. 30, 1938 |
| 2,297,302 | Hornschuch | Sept. 29, 1942 |
| 2,365,046 | Bottomley | Dec. 12, 1944 |